United States Patent [19]

Kalippke et al.

[11] 4,071,792

[45] Jan. 31, 1978

[54] ENGINE IGNITION TIMING SIGNAL GENERATOR HAVING A REDUCED NUMBER OF PERMANENT MAGNETS

[75] Inventors: Harald Kalippke, Hohenacker; Richard Gerber; Karl Ehrmann, both of Stuttgart, all of Germany

[73] Assignee: Robert Bosch GmbH, Stuttgart, Germany

[21] Appl. No.: 738,441

[22] Filed: Nov. 3, 1976

[30] Foreign Application Priority Data

Nov. 25, 1975 Germany ............................ 2552754

[51] Int. Cl.[2] ............................................ H02K 21/22

[52] U.S. Cl. .................................. 310/70 R; 310/153

[58] Field of Search ................... 310/70 R, 70 A, 153, 310/156, 190–193; 123/146, 148 R, 149 R, 148 CC, 149 C

[56] References Cited

U.S. PATENT DOCUMENTS

| | | | |
|---|---|---|---|
| 2,710,929 | 6/1955 | Phelon | 310/70 A |
| 3,626,223 | 12/1971 | Maier | 310/153 |
| 3,821,571 | 6/1974 | Honshi | 310/70 R |
| 3,974,817 | 8/1976 | Henderson et al. | 123/149 C |
| 3,998,197 | 12/1976 | Katsumata | 123/148 CC |

*Primary Examiner*—Donovan F. Duggan
*Attorney, Agent, or Firm*—Flynn & Frishauf

[57] ABSTRACT

Four pole pieces embedded in the cylindrical periphery of a non-magnetic rotor disk are connected with each of a number of magnets embedded in the disk in circumferentially distributed positions spaced from the rotor shaft and from the disk periphery. Of these pole pieces, one circumferentially interleaved pair is connected with one pole of the magnet by a magnetically conducting yoke strip embedded in one circular face of the disk and the other pair is similarly connected with the other pole of the magnet. The spacing between the first and second pole piece is equal to the spacing between the third and fourth and less than that between the second and third, the latter spacing being equal to the spacing between groups of pole pieces associated with different magnets, for the case of a uniformly timed firing sequence of a multicylinder engine.

5 Claims, 1 Drawing Figure

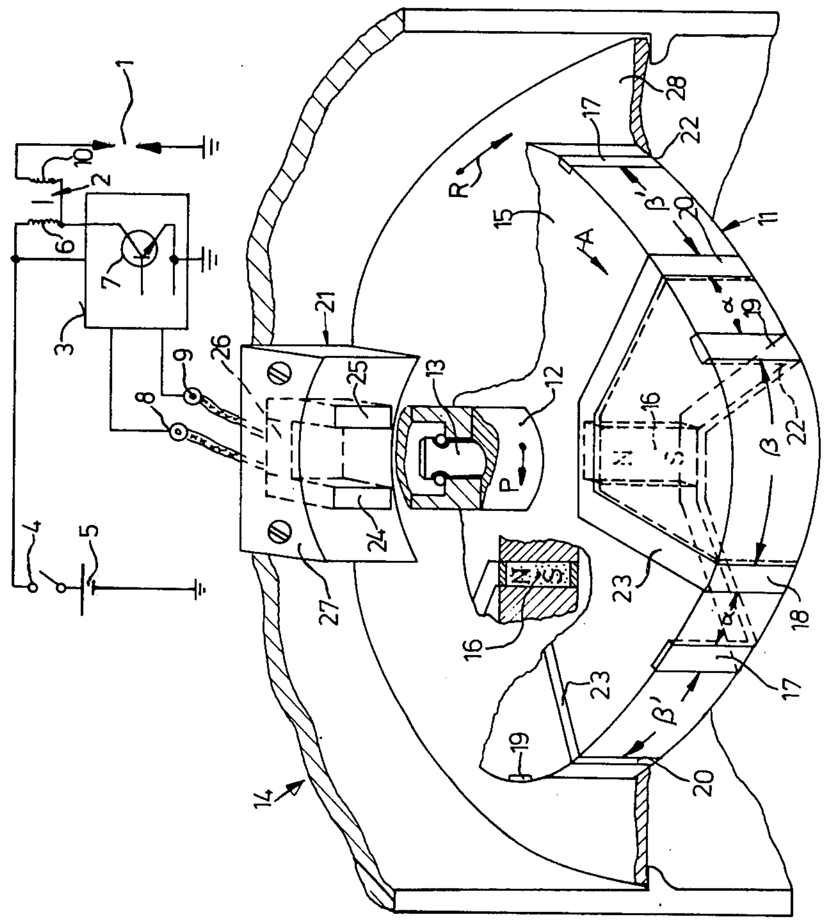

ENGINE IGNITION TIMING SIGNAL GENERATOR HAVING A REDUCED NUMBER OF PERMANENT MAGNETS

CROSS REFERENCE TO RELATED APPLICATION:

Inventor: Gerhard Schaal, Ser. No. 734,770, filed Oct. 22, 1976.

This invention relates to a timing signal generator for an electrical ignition system of an internal combustion engine having a rotor in the form of a pole wheel in which permanently magnetized elements are set, which rotor is mounted on a shaft for rotation within a stator having an electrically transmitting element adjacent to the periphery of the rotor thereby responsive to the rotation of the latter. Magnets carried by the rotor are spaced radially from the rotor shaft and also angularly from each other, and the flux of the magnets is concentrated at pole pieces, so that movement of the rotor periphery past the transmitting element will produce electrical signals.

By the use of such timing signal generators for initiating ignition-producing events in an engine, it is possible to dispense with the mechanical interruptor originally used for ignition timing and thus avoid irregularities in operation resulting from wear and the accumulation of dirt at the contacts of such a mechanical interruptor.

A timing signal generator of the above-mentioned kind is disclosed in FIGS. 7 and 8 of German Pat. No. 1,193,309 in which the permanent magnets have the form of ring segments concentric to the rotor shaft in which the surfaces limiting the segments in the circumferential direction form the magnet poles and in which in the angular space between two poles of the same polarity, a pole piece is inserted. In this kind of structure four permanent magnets are needed for four pole pieces, an arrangement that requires relatively high expense for premagnetized material, so that the complete structure is consequently costly. Furthermore, in that case it is not possible to prevent the individual permanent magnets which in their mounted condition at least approximately surround the rotor shaft in a ring, the shaft usually being of steel, from losing considerable effectiveness for the signal generator by stray flux passing through the shaft.

It is an object of the present invention to provide a timing signal generator of the kind first described above in which the deficiencies of the known forms of construction of such generators can be avoided.

SUMMARY OF THE INVENTION

Briefly, the permanent magnets are embedded in a disk-like matrix body of non-magnetic material centered on the rotor shaft and filling the angular spaces between the magnets. The disk is arranged to be driven by the shaft, but is not necessarily affixed thereto, since it is normally driven through the usual centrifugal-force-control device for shifting the position of the disk with respect to the shaft in accordance with the speed of rotation. Each embedded magnet is provided with a group of pole pieces for concentrating the magnet flux in desired paths. Each group is made up of four pole pieces, two for each magnet pole. The two pole piec-s for a magnet pole are preferably connected to the magnet by a strip-like magnetically conducting path in the form of a yoke with its center on the magnet pole. The pole pieces extend from the yoke ends in claw shape, being embedded in the cylindrical surface that defines the periphery of the disk-like matrix body. In the order in which the pole pieces pass by the transmitting element mounted on the stator of the generator, the first and third pole piece are connected with one pole of a magnet through legs that form a yoke on one face of the disk-like matrix body and the second and fourth pole piece connect with the other pole of the magnet through portions that form a yoke strip on the other face of the matrix body. Furthermore, in the preferred form of the invention, spacing between the third and fourth are equal to a first predetermined spacing and the spacing between the second and third is greater than that first predetermined spacing and, in the case of a uniform engine cylinder firing sequence, equal to the spacing between pole piece groups of adjacent magnets.

DESCRIPTION OF THE PREFERRED EMBODIMENT

The invention is further described by way of illustration, with reference to the single FIGURE of the annexed drawing, which shows a timing generator structure broken away to show the interior construction, the rotor and shaft being likewise broken away to show their structure and to show the transmitting element on the stator, the illustration being completed by a diagrammatic representation of the remainder of the ignition circuit of a motor vehicle.

The drawing is in the form of a perspective sketch, but because of the difficulties of showing perspective by mechanical drawing methods, the circular contours are somewhat distorted, but it must be understood that the disk-shaped body 15 of the rotor 11 has a periphery having the shape of a circular cylinder of short axial length.

The upper part of the drawing shows very diagrammatically the electrical ignition system of an internal combustion in which the timing signal generator shown in the lower part of the drawing operates. This ignition system comprises a spark plug 1, a spark coil 2, a transistorized switching device 3, an ignition switch 4 for putting the ignition system into operation and a direct-current source such as a vehicle battery 5. The direct-current source 5 has its negative pole grounded to the engine frame or chassis and its positive pole connected through the ignition switch 4 both to the transistorized circuit unit 3 and to one end of the primary winding 6 of the spark coil 2. The other end of the primary winding 6 is connected through the emitter-collector path of a transistor 7 belonging to the transistorized circuit 3 to ground, the transistor 7 being switched into its nonconducting condition by a timing signal that is supplied by the timing signal generator to the terminals 8 and 9. The secondary winding 10 of the spark coil 2 is connected to one electrode of a spark plug 1 which has its other electrode grounded. The transistorized circuit 3 may be any of a number of known circuits. A preferred circuit for this purpose is that disclosed in the copending application of Gerhard Schaal, attorney docket FF 6415, corresponding to and claiming the priority of German patent application P 25 50 512.8 of Nov. 11, 1975, commonly owned with the present application.

The timing signal generator shown in the drawing is provided with a rotor 11 that is mounted on a shaft 13 by means of a sleeve 12. The shaft 13 is intended to represent the shaft of an ignition distributor 14 only partly illustrated in the drawing. In this connection, it should be mentioned, that although the secondary coil 10 of the spark coil is shown connected to only a single spark plug, that is a symbolic or diagrammatic representation, since such an ignition system commonly provide ignition for a number of spark plugs located in as many cylinders of an engine, with the connection between the secondary coil 10 and the spark plug 1 passing through a spark distributor device of a well-known kind which, in the present case, would be located in a portion of the casing 14 that is not shown in the drawing. A timing shift device operable by centrifugal force, which is not shown in the drawing, but is also located in the casing 14, controls the rotary position of the sleeve 12 within a limited range by exerting a force designated by the arrow P that may typically operate against the force of a restoring spring (not shown), so as to shift the spark timing in a manner dependent upon engine speed.

The rotor 11 has a disk of round contour and cylindrical periphery centered on the shaft 13 by means of the sleeve 12, and since this disk carries the other elements of the rotor embedded in its surface, it may be referred to as a matrix body. The matrix body 15 consists of magnetically non-conducting material, for example of aluminum or of a synthetic resin and is rigidly affixed to the sleeve 12. In it are embedded a number of permanent magnets 16. The individual permanent magnets 16 have the form of a rectangular plate with the plate surfaces lying in planes that are at least approximately chord planes of the cylindrical disk edge, with the magnet adjacent to the center of the chord. The permanent magnets 16 are spaced radially from the shaft 13 and angularly from each other, with the spaces being filled up by the material of the matrix body 15. In the illustrated case, the matrix body 15 contains four embedded permanent magnets, but since the rotor is shown broken away, only two of these permanent magnets 16 are visible in the drawing. The permanent magnets 16 are desirably set at the same distance from the shaft 13 and at equal angular spacing from one to the next in the circumferential direction.

Each of the permanent magnets 16 magnetizes four pole pieces 17,18,19 and 20 embedded in the cylindrical surface that defines the periphery of the matrix disk 15, so as to generate spark timing signals in an electrical transmitting element 21 by moving past the latter as the rotor 11 rotates. The pole pieces 17,18,19 and 20 form a group such as is provided for each of the permanent magnets 16, so that in the illustrated case, during a complete revolution of the rotor 11, four such groups will pass by the transmitting element 21. The arrangement of the pole pieces is so designed that of the four belonging to a single group movable in succession past the transmitting element 21 in the direction of rotation A, the first pole piece 17 and the third pole piece 19 are magnetically connected with the magnet pole S, in the illustrated case, therefore, with the South pole, and the second pole piece 18 and the fourth pole piece 20 similarly with the other magnet pole N, in the illustrated case, therefore, with the North pole, the connections being by magnetically conducting (highly permeable) paths. In consequence, for the excitation of a multiplicity of pole pieces with magnetic flux, relatively few permanent magnets are needed in this configuration.

In order to produce effective timing signals, it is desirable that among the four pole pieces belonging to one group, identified in the order in which they pass the transmitting element 21, the angular spacing between the first pole piece 17 and the second pole piece 18 is the same angle $\alpha$ as the spacing between the third pole piece 19 and the fourth pole piece 20, whereas the spacing between the second pole piece 18 and the third pole piece 19 is the angular spacing $\beta$ which is greater than the previously mentioned angular spacing $\alpha$. The angular spacing $\beta$ is equal to the angular spacing $\beta'$ between the end-of-sequence pole pieces of two different groups whenever a uniform firing sequence timing is desired for a multicylinder engine.

A simple form of construction is obtained by providing that the first pole piece 17 and the third pole piece 19 of the four pole pieces 17,18,19 and 20 are connected together by end sections of an at least approximately strip-shaped yoke path 22 of magnetically conducting material, for example soft iron, and the second pole piece 18 and the fourth pole piece 20 are likewise connected by an at least approximately strip-shaped yoke paths 23 of magnetic conducting material such as soft iron. The first yoke path 22 is in contact with the magnet pole S and the second yoke path 23 with the other magnet pole N of the permanent magnet 16 which, in this case, is magnetized perpendicularly to the planes of the faces of the matrix disk 15. For this construction, the yoke paths 22 and 23 may be unitary or they may be laminated. In order to assemble the rotor 11 as a complete unit, the first yoke path 22 is embedded in one face of the disk matrix 15, in the illustrated case in the bottom face, and the second yoke path 23 is embedded in the other face, in the illustrated case the upper face, so that the end sections of these yoke paths 22 and 23 are bent around in claw-like fashion to constitute the pole pieces 17,18,19 and 20 embedded in the peripheral surface of the matrix disk 15. The embedding of the permanent magnet 16 and of the yoke paths 22 and 23 and their pole piece ends can in a simple fashion be performed in the manufacturing production of the disk body 15 by means of a casting or injection molding process.

The transmitting element 21 has two legs 24 and 25 of magnetically conducting material, for example soft iron, and an interposed circuit element 26 designed to produce an electric timing signal at the terminals 8 and 9 in response to magnetic influence. This circuit element 26, not further particularized in the drawing, can for example be a coil wound on an iron core, a reed switch, a field plate changing its ohmic resistance value under magnetic influence or a so-called Hall generator.

The leg pieces 24 and 25 and the circuit element 26 are in the illustrated case cast into a block 27 made of a casting resin, the block 27 being affixed to a carrier plate 28 set in the casing 14. The carrier plate 28 can, if desired, be angularly shiftable about the axis of the shaft 13 within a limited range by a force R of an engine intake vacuum timing shift device of known form (not shown), so that the spark timing is automatically fitted to the load conditions under which the internal combustion engine operates. In the illustrated case, the timing signal useable for setting off an ignition spark is generated when one of the pole piece pairs 17,18 or 19,20 moves past the leg pieces 24 and 25 forming the yoke of the transmitting element 21. In response to the signal thus generated, the current flowing through the primary winding 6 and the transistor 7 is interrupted, which consequently produces a high voltage pulse in the secondary winding 10 and an electric discharge (ignition spark) in the spark plug 10.

Although the invention is described with reference to a particular illustrative embodiment, variations are possible within the inventive concept.

We claim:

1. A timing signal generator for an electrical ignition system of an internal combustion engine having a rotor in the form of a pole wheel in which permanently magnetized magnet elements are set, which rotor is mounted on a shaft for rotation within a stator having an electrically transmitting element (21) responsive to the rotation of the rotor past the transmitting element for producing a signal in a control circuit of said ignition system, in which there is the improvement that said rotor comprises:

a disk-like matrix body (15) of non-magnetic material centered on said shaft (13) for carrying permanent magnets (16) and pole pieces (17,18,19,20) embedded therein, said matrix body (15) filling the angular intervals between said permanent magnets, having a cylindrical surface defining its periphery and being mounted on said shaft in a way that enables rotation of said shaft to produce coaxial rotation of said disk in the same direction of rotation;

a plurality of permanent magnets (16) embedded in said matrix body (15) at locations intermediate between said shaft and said periphery, and a group of pole pieces (17,18,19,20) for each of said magnets (16) embedded in the periphery of said matrix body (15) and each connected to a pole of the magnet by an elongated magnetically conducting body embedded in said matrix body.

2. A timing signal generator as defined in claim 1, in which each group of pole pieces provided for one of said magnets (16) comprises two pole pieces (17,19) respectively connected by magnetically conducting bodies with one pole (S) of said magnet and two pole pieces (18,20) respectively connected by magnetically conducting bodies with the other pole (N) of said magnet.

3. A timing signal generator as defined in claim 2, in which the four pole pieces of each said group provided for a single magnet (16) the respective portions of them embedded in the periphery of the matrix body are arranged so as to be spaced from each other in said periphery and hence to pass by said transmitting element (21) in time-space succession, by which they may be identified as the first, second, third and fourth pole piece, respectively, and in which, further, the first (17) and third (19) pole piece so identified are magnetically connected with a first pole (S) of the magnet and the second (18) and fourth (20) of said pole pieces so identified are magnetically connected with the other pole (N) of said magnet (16).

4. A timing signal generator as defined in claim 3, in which in each said group of four pole pieces (17,18,19,20) the first (17) and second (18) pole pieces have an angular spacing ($\alpha$) equal to the angular spacing of the third (19) and fourth (20) of said pole pieces and less than the angular spacing ($\beta$) between the spaced (18) and third (19) of said pole pieces.

5. A timing signal generator as defined in claim 3, in which said first (17) and third (19) pole pieces are connected magnetically to a first pole (S) of the magnet (16) for which the group of pole pieces is provided by magnetically conducting bodies forming a first substantially strip-like yoke path (22) of magnetically conducting material and said second (18) and fourth (20) pole pieces are connected to the other pole (N) of said magnet (16) by magnetically conducting bodies forming a second substantially strip-like yoke path (23) of magnetically conducting material, and in which the poles of said magnet are in contact with said magnetically conducting bodies at the respective centers of said yoke paths.

* * * * *